(12) United States Patent  
Matsumiya et al.

(10) Patent No.: US 8,553,232 B2  
(45) Date of Patent: Oct. 8, 2013

(54) INTERFERENCE OBJECTIVE LENS UNIT AND LIGHT-INTERFERENCE MEASURING APPARATUS USING THEREOF

(75) Inventors: Sadayuki Matsumiya, Sagamihara (JP); Tatsuya Nagahama, Kawasaki (JP); Atsushi Usami, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 115 days.

(21) Appl. No.: 13/279,855

(22) Filed: Oct. 24, 2011

(65) Prior Publication Data

US 2012/0099115 A1    Apr. 26, 2012

(30) Foreign Application Priority Data

Oct. 26, 2010    (JP) .................................. 2010-239570

(51) Int. Cl.  
  *G01B 11/02*  (2006.01)  
  *G01B 9/02*   (2006.01)

(52) U.S. Cl.  
  USPC .......................................... 356/511; 356/450

(58) Field of Classification Search  
  USPC ............................ 356/511–516, 450; 359/629  
  See application file for complete search history.

(56) References Cited

U.S. PATENT DOCUMENTS

| | | | |
|---|---|---|---|
| 5,067,808 A |   | 11/1991 | Alscher |
| 5,978,086 A |   | 11/1999 | Aziz et al. |
| 6,980,360 B2 | * | 12/2005 | Ue ................................ 359/392 |
| 7,522,343 B2 | * | 4/2009  | Hsieh ............................ 359/634 |
| 2006/0244970 A1 |   | 11/2006 | Craft et al. |
| 2009/0040603 A1 | * | 2/2009  | Nagahama et al. ........... 359/389 |

FOREIGN PATENT DOCUMENTS

JP    A-2003-148921    5/2003

OTHER PUBLICATIONS

Extended European Search Report issued in European Patent Application No. 11186524.2 dated Jan. 27, 2012.

* cited by examiner

*Primary Examiner* — Michael A Lyons  
(74) *Attorney, Agent, or Firm* — Oliff & Berridge, PLC.

(57) ABSTRACT

Disclosed is an interference objective lens unit, comprising: an objective lens; a beam splitter that splits the light transmitted through the objective lens into a reference optical path in which a reference mirror is provided and a measuring optical path in which the measuring object is placed, and that superposes the split lights to output interference light; a first holder that holds the objective lens and that is formed by material having a first linear expansion coefficient; and a second holder that holds the reference mirror and that is formed by material having a second linear expansion coefficient different from the first linear expansion coefficient, wherein when a usage environment temperature changes, a difference in the linear expansion coefficients between the first holder and the second holder corrects an optical path difference between the reference optical path and the measuring optical path.

8 Claims, 11 Drawing Sheets

------- BEFORE TEMPERATURE CHANGE
———— AFTER TEMPERATURE CHANGE

INTERFERENCE OBJECTIVE LENS UNIT AND LIGHT-INTERFERENCE MEASURING APPARATUS USING THEREOF

BACKGROUND OF THE INVENTION

1. Field of the Invention

The present invention relates to an interference objective lens unit and a light-interference measuring apparatus using thereof.

2. Description of the Related Art

Conventionally, there is known a light-interference measuring apparatus such as a three-dimensional shape measuring apparatus. The three-dimensional shape measuring apparatus precisely measures the three-dimensional shape of a measuring object, for example, by using the luminance information of interference fringes generated by the interference of lights. A technique using a broad band light (white light and the like) as a light source is widely known in this light-interference measuring apparatus (see, for example, Japanese Patent Application Laid-Open Publication No. 2003-148921).

When the broadband light is used as the light source, the peaks of luminance of the interference fringes of the respective wavelengths overlap one another and the luminance of the overlapped interference fringes becomes larger at the focused position. However, the more distant from the focused position, the larger the peak luminance positions of the interference fringes of the wavelengths shift from each other and the amplitude of the luminance of the superposed interference fringes be smaller gradually.

Therefore, the light-interference measuring apparatus can consequently measure, for example, the three-dimensional shape of a measuring object by detecting the position of peak luminance at each position in a visual field.

The interference objective lenses to be used for such light-interference measuring apparatus mainly include Michelson type lenses and Mirau type lenses, which are used according to the magnification ratios of the interference objective lenses. In general, the Mirau type lenses are used for the interference objective lenses of high magnification ratios, and the Michelson type lenses are used for the interference objective lenses of low magnification ratios.

Figure 7:
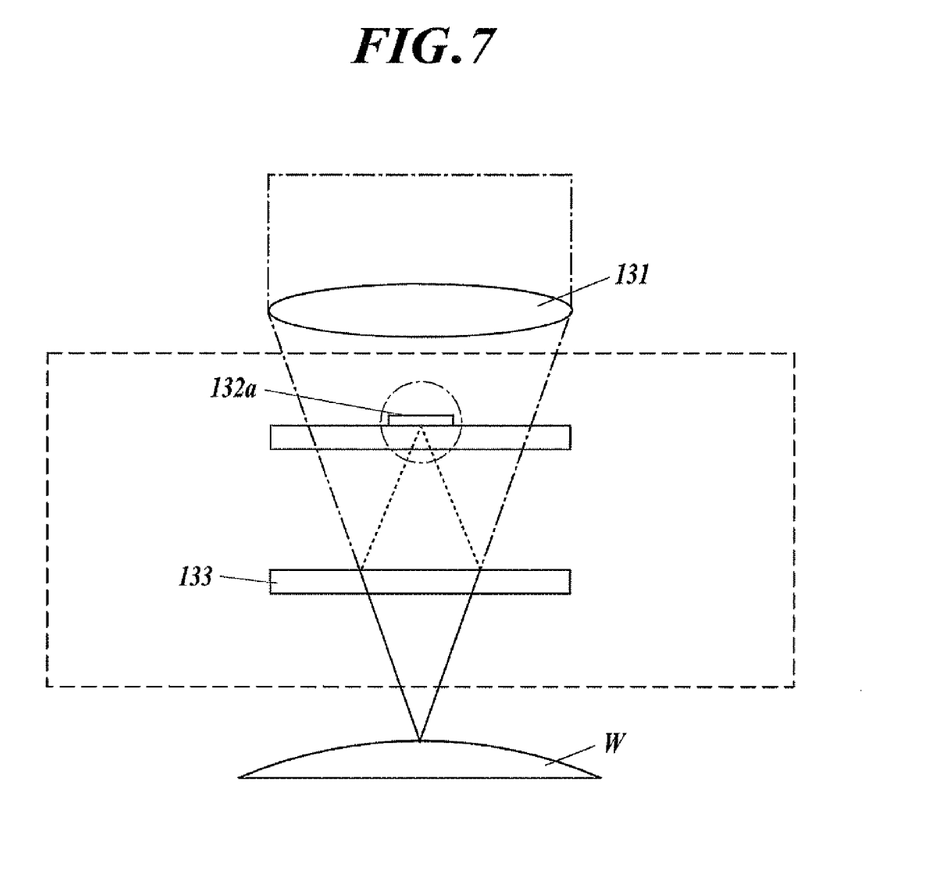
FIG. 7 shows a basic configuration of a conventional Mirau type interference objective lens.
Figure 8:
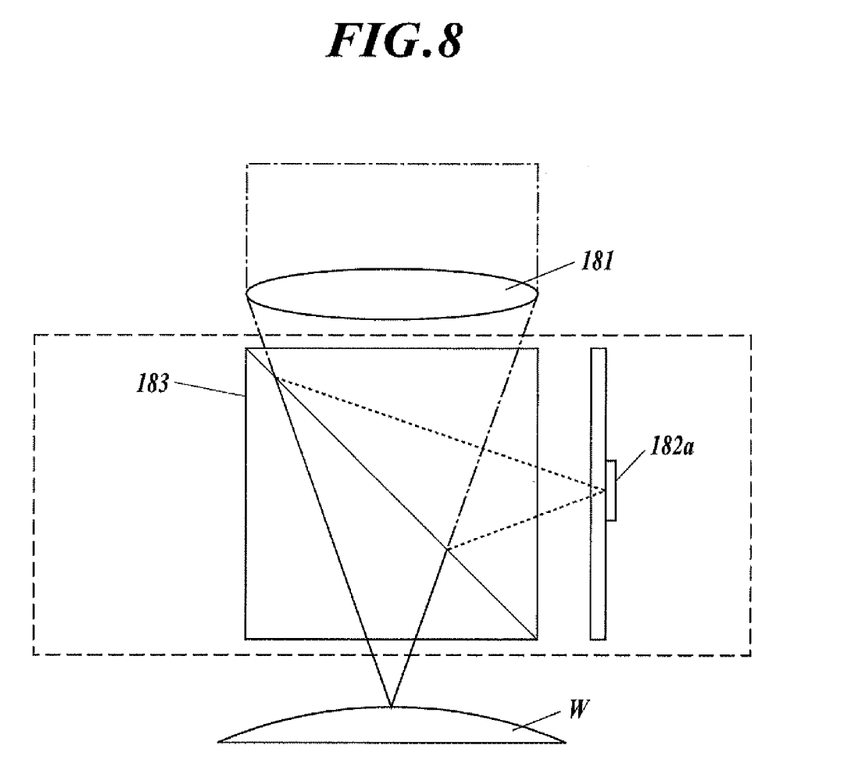
FIG. 8 shows a basic configuration of a conventional Michelson type interference objective lens.

FIG. 7 is a schematic view showing the basic configuration of the Mirau type interference objective lens. FIG. 8 is a schematic view showing the basic configuration of the Michelson type interference objective lens.

As shown in FIGS. 7 and 8, an optical path of light emitted from the interference objective lens is branched by a beam splitter such as a beam splitter plate 133 or a beam splitter cube 183 into a reference optical path (denoted by the broken line in the drawing) including a reference mirror 132a, 182a therein and a measuring optical path (denoted by the solid line in the drawing) including a measuring object arranged therein. Thereafter, reflected light from the reference mirror (reference light) and reflected light from the measuring object (object light) are superposed by the beam splitter.

When the difference of the optical path lengths between the reference optical path and the measuring optical path is adjusted to be zero by the position of the beam splitter, the reference light and the object light have same phase with each other. Thus, the interference light wave is reinforced.

Figure 9:
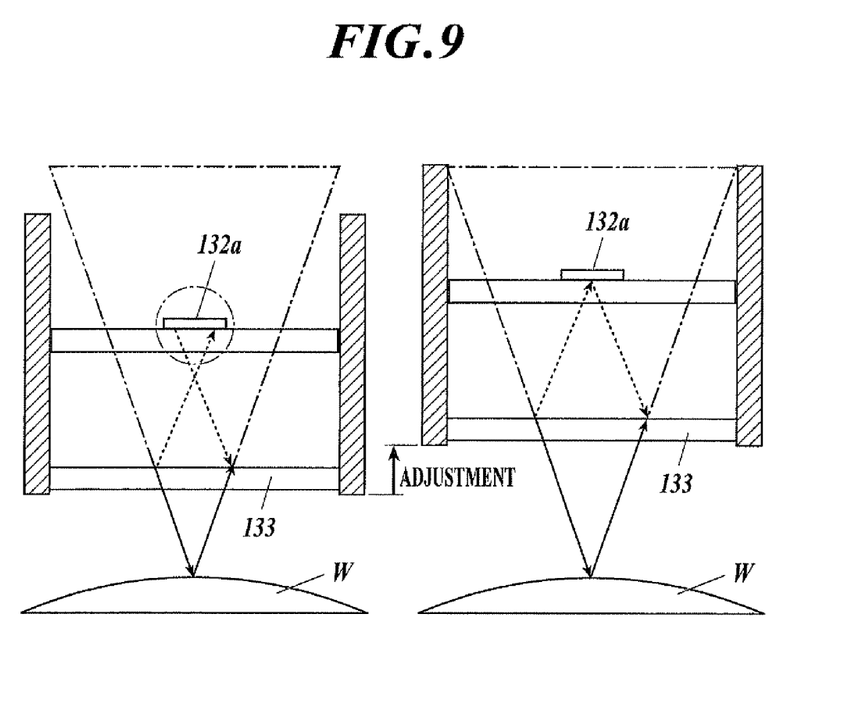
FIG. 9 is a diagram for describing a setting of the position of the beam splitter.

Therefore, when using an interference objective lens unit, the position of the beam splitter is set so that the reference light and the object light have same phase with each other as shown in FIG. 9.

Figure 10:
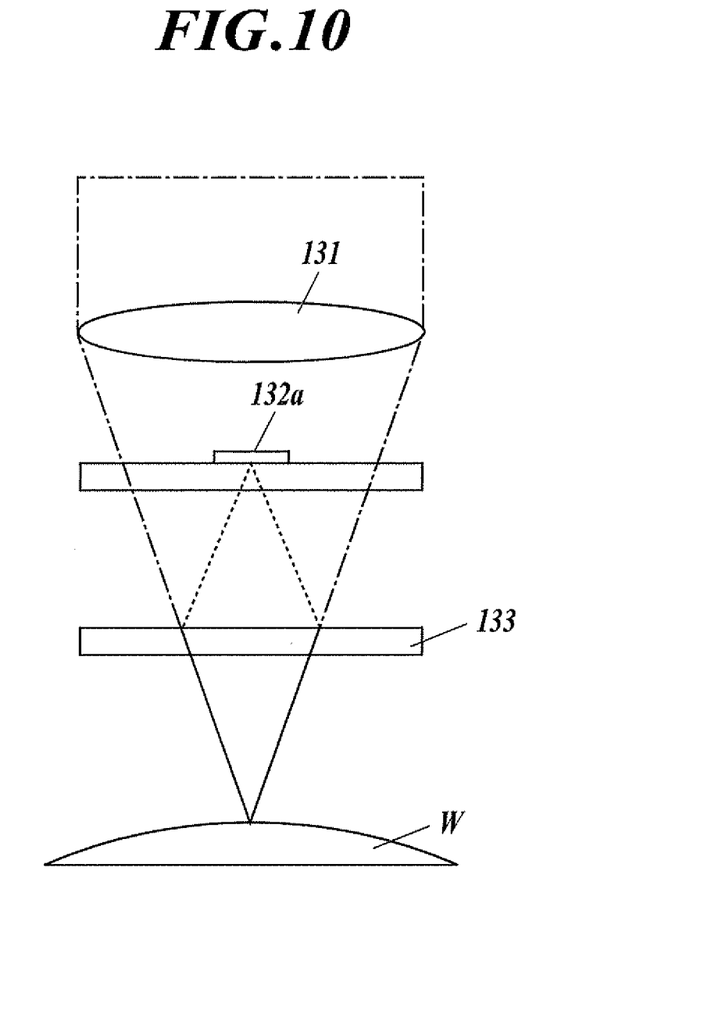
FIG. 10 shows the position of the beam splitter where the focal plane of the interference objective lens and the reflecting plane of the reference mirror 132a are conjugated.

At the position of the beam splitter where the reference light and the object light have same phase with each other, that is, where the focal plane of the interference objective lens and the reflecting plane of the reference mirror 132a are conjugated (see FIG. 10), interference fringes can be seen in clear contrast.

Figure 11:
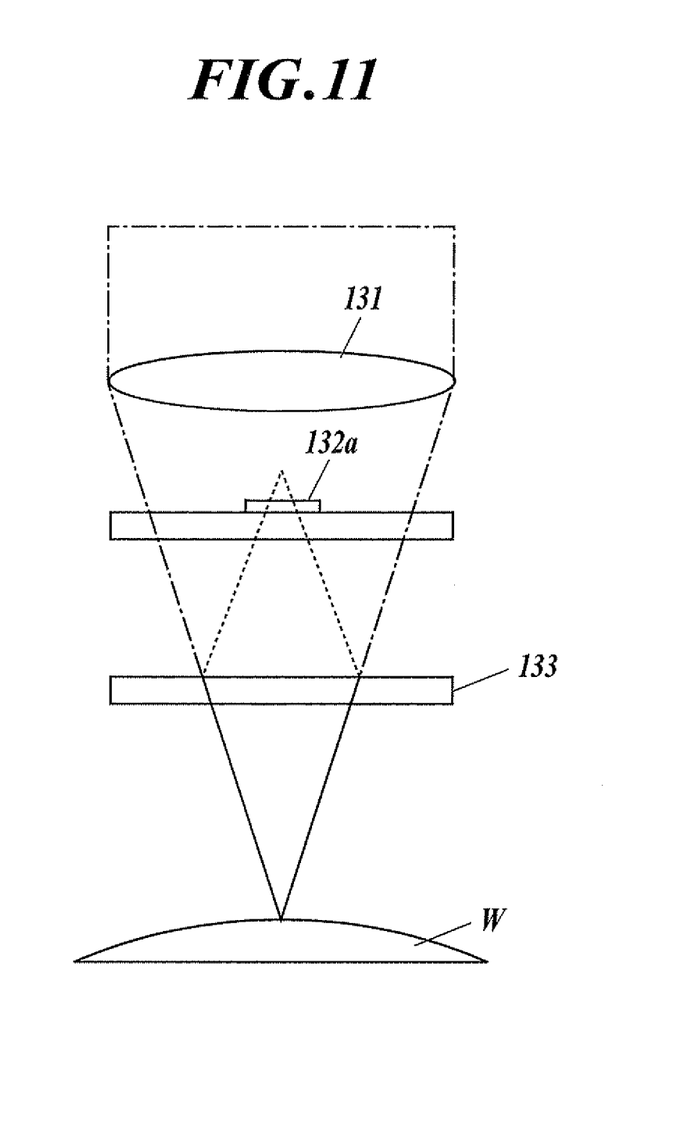
FIG. 11 shows the position of the beam splitter where the focal plane of the interference objective lens and the reflecting plane of the reference mirror 132a become unconjugated.

However, when environmental temperature of an interference objective lens changes after setting a position of the beam splitter, space between optical elements, curvature and refractive index of the objective lens and the like change. Thus, the focal length of the objective lens changes and the focal plane of the interference objective lens and the reflecting plane of the reference mirror 132a become unconjugated (see FIG. 11). As a result, phase difference between the reference light and the object light arises and the brightness of the interference fringes decreases.

In addition, the setting of a position of optical elements in the interference system to keep the brightness of the interference fringes, as environmental temperature changes is cumbersome.

SUMMARY OF THE INVENTION

The object of the present invention is to provide an interference objective lens unit and a light-interference measuring apparatus using the an interference objective lens unit that can be used for a measurement of high precision without decreasing the brightness of the interference fringes even when environmental temperature changes.

In order to solve the problem, an embodiment of the present invention provides an interference objective lens unit, comprising:

an objective lens that causes light emitted from a light source to converge on a measuring object;

a beam splitter that is provided closer to the measuring object than the objective lens, that splits the light transmitted through the objective lens into a reference optical path in which a reference mirror is provided and a measuring optical path in which the measuring object is placed, and that superposes reflected light from the reference mirror and reflected light from the measuring object to output interference light;

a first holder that holds the objective lens and that is formed by material having a first linear expansion coefficient; and a second holder that holds the reference mirror and that is formed by material having a second linear expansion coefficient which is different from the first linear expansion coefficient, wherein when a usage environment temperature changes, a difference in the linear expansion coefficients between the first holder and the second holder corrects an optical path difference between the reference optical path and the measuring optical path.

Another embodiment of the present invention provides a light-interference measuring apparatus, comprising:

the interference objective lens unit;

a light source that outputs light to the interference objective lens unit;

an optical path length changing unit that changes at least one of the reference optical path and the measuring optical path; and an imaging unit that images an interference image by the interference light output from the interference objective lens unit.

BRIEF DESCRIPTION OF THE DRAWINGS

The present invention will more fully be understood by the following detailed description and the accompanying drawings, but those are only for description and are not intended to limit the scope of the present invention, wherein.

DETAILED DESCRIPTION OF THE PREFERRED EMBODIMENTS

Hereinafter, a three-dimensional shape measuring apparatus (hereinafter referred to as a shape measuring apparatus) as a light-interference measuring apparatus according to the present invention will be described in detail with reference to the accompanying drawings.

First of all, the configuration of the shape measuring apparatus 1 is described.

Figure 1:
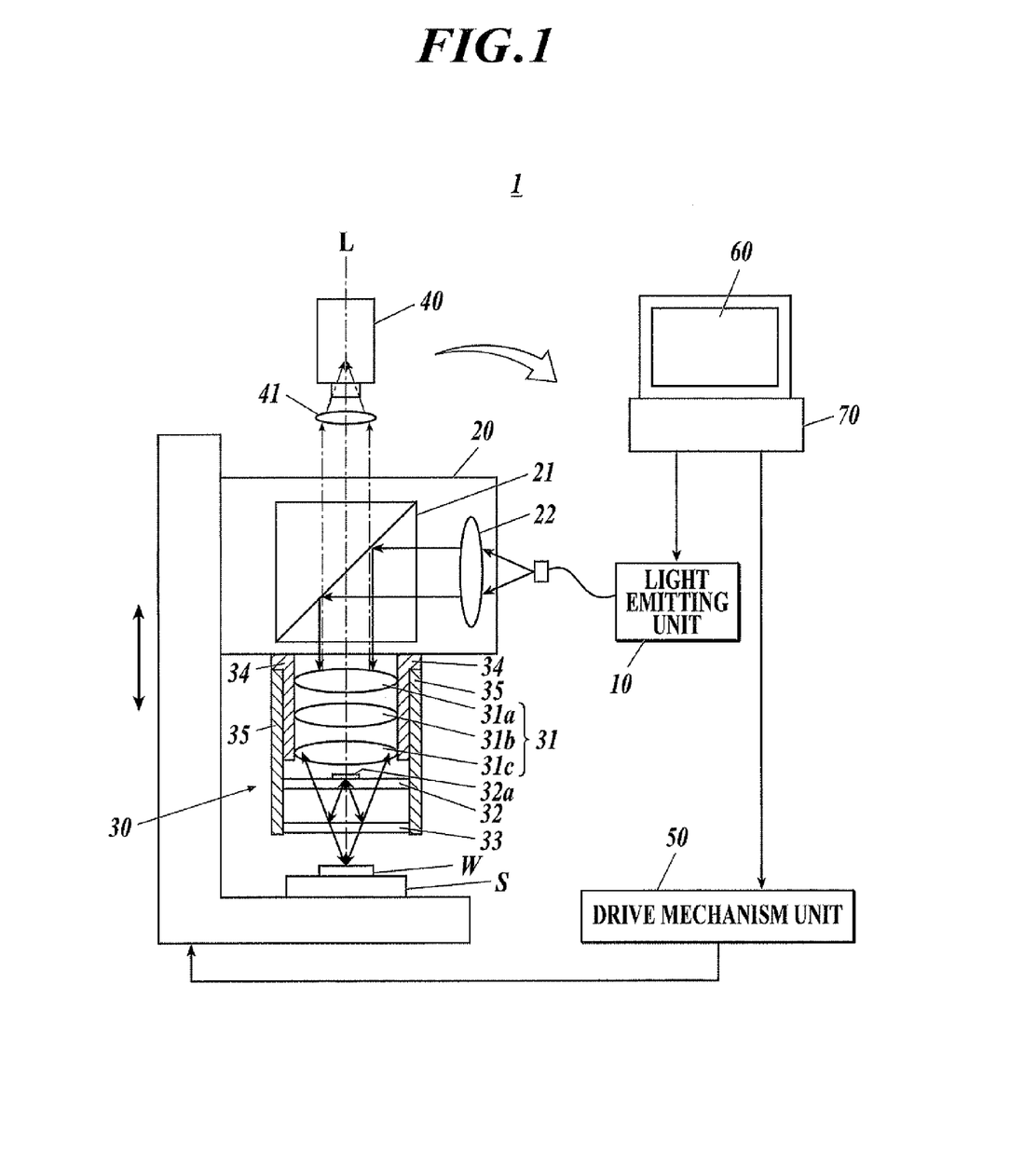
FIG. 1 shows an overall configuration of a three-dimensional shape measuring apparatus as the light-interference measuring apparatus of the first embodiment.

As shown in FIG. 1, the shape measuring apparatus 1 includes a light emitting unit 10, an optical head unit 20, an interference objective lens unit 30, an image forming lens 41, an imaging unit 40, a drive mechanism unit 50, a display unit 60, a control unit 70 and a stage S for placing a measuring object (unit to be measured) W thereon.

The light emitting unit 10 includes a light source which outputs a broad band light including a plurality of wavelength components ranging over a wide band, the broad band light having low coherency. As for the light source, for example, a white light source such as a halogen lamp or a light emitting diode (LED) can be used.

The optical head unit 20 includes a beam splitter 21 and a collimator lens 22. The light emitted from the light emitting unit 10 is collimated through the collimator lens 22, and the collimated light is radiated to the beam splitter 21 from the direction orthogonal to the optical axis L of the interference objective lens unit 30. The collimated light reflected by the beam splitter 21 is emitted downward along the optical axis L, and the collimated light is radiated to the interference objective lens unit 30 from above.

Figure 2:
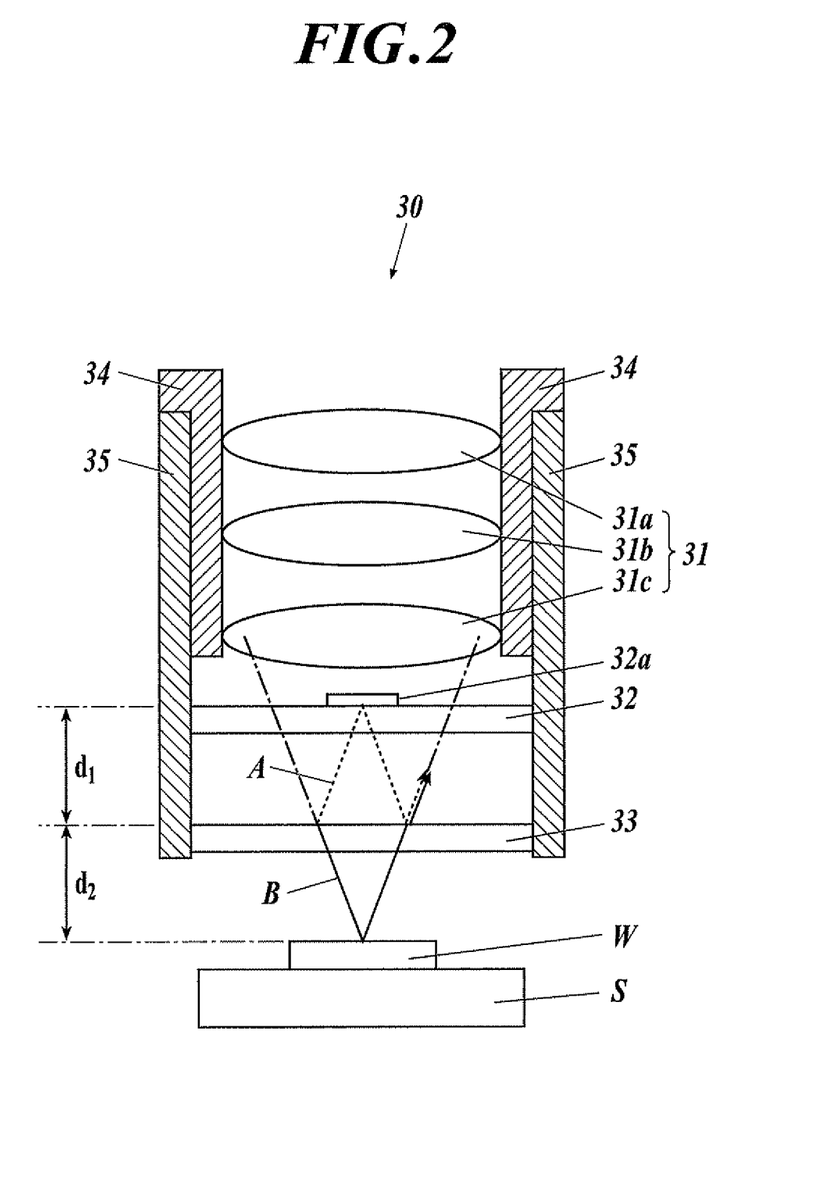
FIG. 2 shows a configuration of an interference objective lens unit in the three-dimensional shape measuring apparatus of FIG. 1.

As shown in FIG. 2, the interference objective lens unit 30 includes an objective lenses 31, a transparent plate 32 having a reference mirror 32a, a beam splitter 33, a first holder 34, and a second holder 35. The objective lens unit 30 is so called Mirau type configuration.

The measuring object W is placed on the stage S below the interference objective lens unit 30.

The objective lenses 31 are composed of convex lenses 31a, 31b, and 31c arranged on the same optical axis L from the upper side in this order. The three convex lenses 31a, 31b, and 31c are held by the first holder 34 so as to maintain a predetermined space thereamong. The light emitted from the beam splitter 21 converges at the measuring object W by passing through the convex lenses 31a, 31b, and 31c.

The convex lenses 31a, 31b, and 31c are preferably formed by resin material. The reason is that the price of a resin lens itself is much lower than the price of a glass lens and the resin lens has a weight lighter than that of the glass lens and thus the strength of the entire apparatus and the control power can be reduced for example.

The resin lens has a higher deformation ratio due to the surrounding environmental temperature than that of the glass lens. Thus, a risk may arise, where the surrounding environmental temperature causes a decrease in measurement precision. However, in the present invention, even when the surrounding environmental temperature causes the deformation of the objective lens and the focal point position is shifted, the reference optical path length can be corrected so that a zero optical path difference is achieved between the reference optical path and the measuring optical path. The transparent plate 32 includes the reference mirror 32a and is provided at the lower side of the objective lenses 31 (the convex lens 31c). The reference mirror 32a reflects a reference light A, which is once reflected by the beam splitter 33 provided below the transparent plate 32, toward the beam splitter 33.

The transparent plate 32 is made of transparent material such as glass or plastic for example.

The beam splitter 33 is a beam splitter plate for example that branches the light, which is emitted from the objective lenses 31 and passes through the transparent plate 32, to the reference optical path having the reference mirror 32a therein (denoted by the broken line in FIG. 2) and the measuring optical path having the measuring object W placed therein (denoted by the solid line in FIG. 2). The beam splitter 33 reflects the reference light A reflected from the reference mirror 32a and allows an object light B reflected by the measuring object W to transmit therethrough. The reference light A and the reflected light B are superposed and irradiated to the upper side.

The transparent plate 32 with the reference mirror 32a and the beam splitter 33 are held by the second holder 35 so as to maintain a predetermined space therebetween.

An interference operation will be described here by using FIG. 2 on the supposition that a collimated light has entered the objective lenses 31 from the upper part of the objective lens unit 30 through the optical head unit 20. Here, the description will be given by using the optical paths along the arrows in FIG. 2, however, the actual interference occurs in rotational symmetry with respect to the optical axis L in FIG. 1.

First, the incident light which entered the objective lenses 31 becomes a convergent light in the objective lenses 31 (convex lenses 31a, 31b, 31c) to enter the beam splitter 33.

The convergent light emitted from the objective lenses 31 is split into the reference light A passing through the reference optical path (denoted by the broken line of FIG. 2) and the object light B passing through the measuring optical path (denoted by the solid line in FIG. 2) by the beam splitter 33.

The reference light A which is reflected by the beam splitter 33 is reflected by the reference mirror 32a, and thereafter, reflected again by the beam splitter 33, and thereafter transmits through the objective lenses 31.

On the other hand, the object light B which is transmitted through the beam splitter 33 converges on one point of the measuring object W, and is reflected at the point to enter and transmit through the beam splitter 33 again, and thereafter transmits through the objective lenses 31.

Here, the reference light A reflected by the reference mirror 32a and the object light B reflected by the measuring object W are superposed by the beam splitter 33 to form a superposed wave.

The superposed wave becomes a parallel beam in the objective lenses 31 to advance to the upper part (denoted by the alternate long and short dash line in FIG. 1) and enters the image forming lens 41. Thereafter, the superposed wave converges in the image forming lens 41 to enter the imaging unit 40, and then focuses on the imaging unit 40, and the imaging unit forms an interference image data. The interference image data is taken into the control unit 70 and a predetermined image processing is carried out to the interference image data.

When the optical path lengths of the reference light A and the object light B are equal to each other, interference fringes are generated.

The first holder 34 holds the convex lenses 31a, 31b, and 31c of the objective lenses 31 with a predetermined space thereamong.

This first holder 34 is made by material having a low linear expansion coefficient for which the length shows substantially no change within a predetermined usage environment temperature range set by an operator in advance. Specifically, the first holder 34 is formed by stainless, Invar alloy, or fine ceramics for example.

In this embodiment, such material having a low linear expansion coefficient is assumed as the material having the first linear expansion coefficient.

By forming the first holder 34 by the material as described above, a change in the space among the convex lenses 31a, 31b, and 31c can be minimized when the temperature changes within the predetermined usage environment temperature range. This can consequently minimize the shift of the focal length due to a change in the space among the convex lenses 31a, 31b, and 31c.

The second holder 35 is provided at the outer face-side of the first holder 34. The lower end section of the second holder 35 extends further than the lower end section of the first holder 34 (extended section). The extended section holds the transparent plate 32 with the reference mirror 32a, and the beam splitter 33.

The second holder 35 is formed by material having the second linear expansion coefficient higher than the first linear expansion coefficient. The material having the second linear expansion coefficient changes the length thereof in a predetermined range, depending on a temperature change within the predetermined usage environment temperature range set by the operator in advance. Specifically, the second holder 35 is formed, for example, by magnesium alloy, copper alloy, or aluminum.

When the temperature changes within the predetermined usage environment temperature range, the above-described first holder 34 can be used to minimize a change of the space among the convex lenses 31a, 31b, and 31c. However, there may be a case where each convex lens 31a, 31b, or 31c itself deforms (or expands) to have a different curvature or refractive index, thus resulting in a different focal length. When the convex lenses 31a, 31b, and 31c are formed by resin material in particular, this deformation of the convex lenses 31a, 31b, and 31c is remarkable.

When the second holder 35 formed by material having the second linear expansion coefficient has a change in the temperature within the predetermined usage environment temperature range, the second holder 35 extends in accordance with the shift of the focal point position due to a change in the curvature or the refractive index of the objective lenses 31 themselves. This can consequently cause a change in the distance between the transparent plate 32 and the beam splitter 33, thus correcting the reference optical path length.

The first holder 34 and the second holder 35 are formed by a material that is appropriately selected and used by an operator depending on the usage environment temperature or the material of the respective convex lenses 31a, 31b, and 31c of the objective lenses 31.

There may also be a case where a change in the temperature within the predetermined usage environment temperature range causes the expansion and contraction of the first holder 34 to thereby cause a slight change in the space among the convex lenses 31a, 31b, and 31c. To deal with this case, the material having the second linear expansion coefficient used for the second holder 35 is selected so as to correct a change in the space among the convex lenses 31a, 31b, and 31c and the shift of the focal length due to a change in the curvature or the refractive index of the convex lenses 31a, 31b, and 31c themselves of the objective lenses 31.

The imaging unit 40 is a charge coupled device (CCD) camera composed of a two-dimensional imaging device for constituting the imaging unit, or the like. The imaging unit 40 forms an interference image data of a superposed wave of the reference light A and the object light B output from the interference objective lens unit 30.

The interference image data formed by the imaging unit 40 is taken into the control unit 70 as an electric signal and a predetermined image processing is carried out to the image data. Thereafter, the interference image is displayed on the display unit 60.

The drive mechanism unit 50 moves the optical head unit 20 in the direction of the optical axis L in conformity with a moving instruction from the control unit 70.

The objective lens unit 30 is moved with the optical head unit 20 in the direction of the optical axis L, and the focused position of the objective lenses 31 is set at a predetermined position on the surface of the measuring object W.

Here, the difference between the optical lengths becomes zero at the position of $d_1 = d_2$ in FIG. 2. The distance $d_1$ indicates the distance from the beam splitter 33 to the reference mirror 32a, and the distance $d_2$ indicates the distance from the beam splitter 33 to the surface position of the measuring object W.

Therefore, the drive mechanism unit 50 moves the optical head unit 20 and the interference objective lens unit 30 in the direction of the optical axis L at the time of measurement to adjust the distance $d_2$ in order that the difference between the optical lengths may be zero ($d_1 = d_2$).

Note that the configuration of adjusting the distance $d_2$ by moving the stage S may also be adopted.

Further, the configuration of changing the distance $d_1$ from the beam splitter 33 to the reference mirror 32 may also be adopted.

As described above, the drive mechanism unit 50 changes at least one of the optical path length of the reference optical path and the measuring optical path as the optical path length changing unit.

The display unit 60 is a monitor to be mounted on a personal computer or the like, for example, and displays the image data of an interference image which is taken into the control unit 70 and to which a predetermined image processing and the like are carried out.

Figure 3:
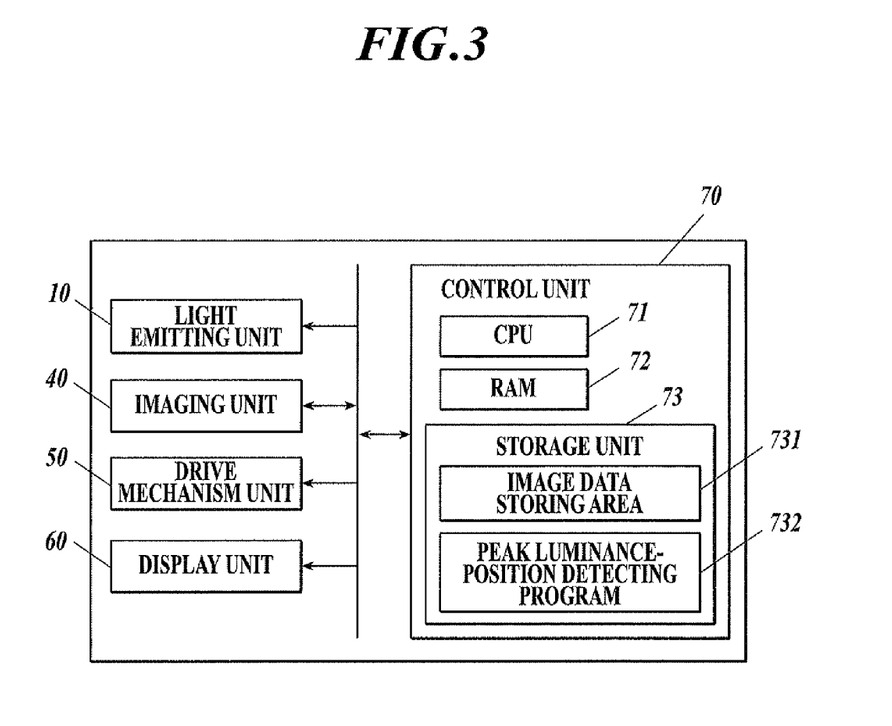
FIG. 3 shows a block diagram of a configuration of the three-dimensional shape measuring apparatus of FIG. 1.

As shown in FIG. 3, the control unit 70 includes a central processing unit (CPU) 71, a random access memory (RAM) 72, a storage unit 73, and the like.

The CPU 71 performs various types of control processing in conformity with various types of processing programs stored in the storage unit 73, for example.

The RAM 72 forms a working memory area for storing the data to which an arithmetic processing is carried out by the CPU 71.

For example, the storage unit 73 stores a system program capable of being executed by the CPU 71, various types of processing programs capable of being executed by the system program, data to be used at the time of the execution of the various types of processing programs, and data of the results of various types of processing obtained by the arithmetic processing being carried out to the data by the CPU 71. The programs are stored in the storage unit 73 in the form of program codes capable of being read by a computer.

In particular, the storage unit 73 is provided with an image data storing area 731 and a peak luminance position detecting program 732, for example.

The image data storing area 731 stores the image data of interference images formed by the imaging unit 40 as a plurality of frames.

Here, the image data stored in the image data storing area 731 is stored after the interference intensity value and the like thereof are properly corrected on the basis of the correction table or the like created in advance in order to exclude, for example, the influences of the sensitivity characteristic of the imaging unit 40 and the like.

The peak luminance-position detecting program 732 is a program, for example, for enabling the CPU 71 to realize the function of detecting the peak luminance position of the destructive interference fringes which are generated at the position at which the optical path difference is zero, based on the interference image data formed by the imaging unit 40.

In particular, when interference fringes are generated, the CPU 71 detects the position at which the intensity of the interference fringes changes, showing the peak intensity, as the position at which the optical path difference is zero.

The CPU 71 functions as a peak luminance position detecting unit by executing the peak luminance position detecting program 732 described above.

Next, the action of the shape measuring apparatus 1 is described.

When the shape measuring apparatus 1 measures a shape, the drive mechanism unit 50 is used to adjust the focal point position so as to achieve the optical path difference of 0 ($d_1=d_2$).

The following section will consider a case where the environmental temperature changed after the above adjustment. This change in the environmental temperature is within the temperature range set by the operator in advance.

In this embodiment, the first holder 34 is formed by material having a low linear expansion coefficient (material having the first linear expansion coefficient). This can minimize a change in the space among the convex lenses 31a, 31b, and 31c. This can substantially minimize the shift of the focal length due to a change in the space among the convex lenses 31a, 31b, and 31c.

Figure 4:
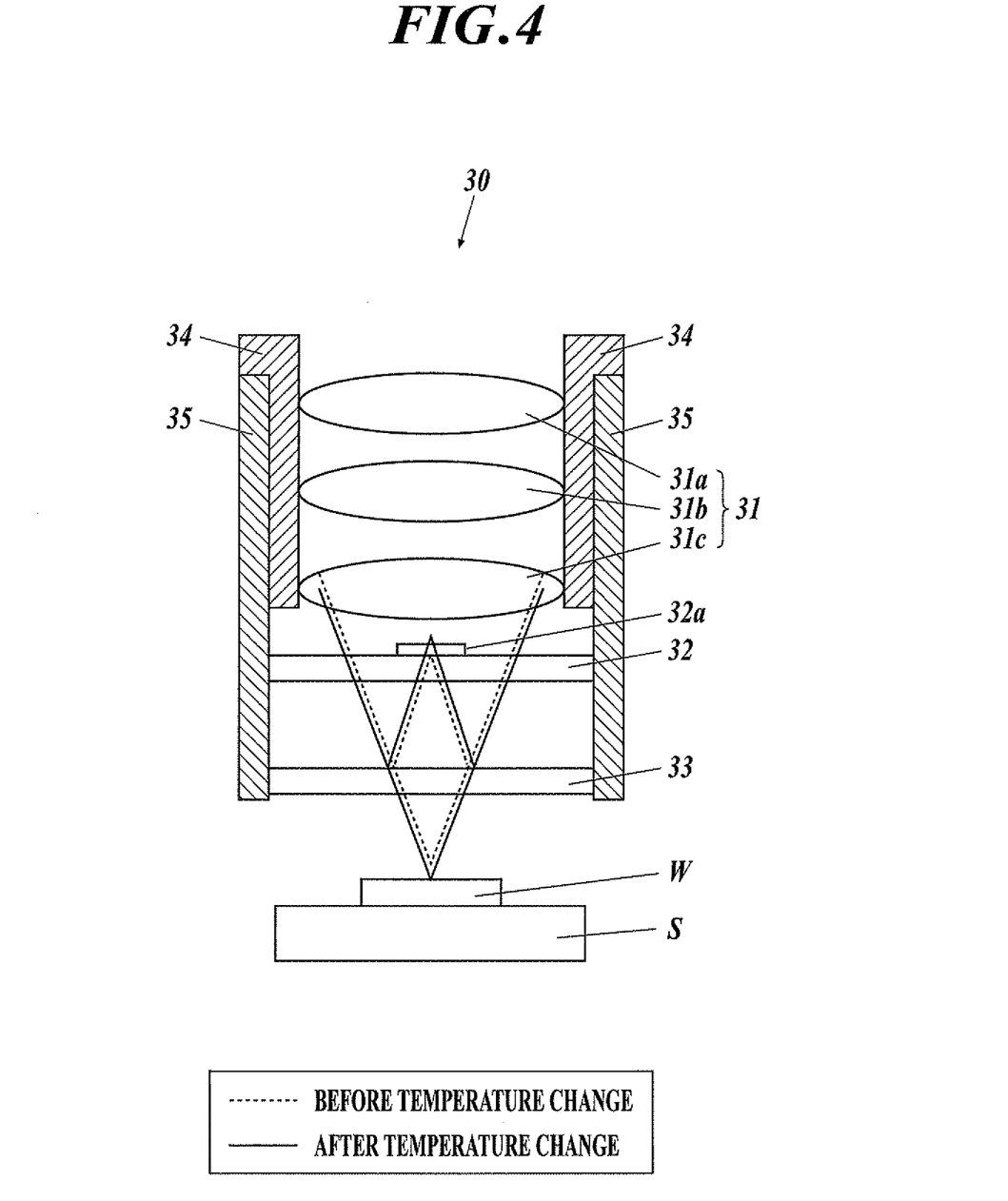
FIG. 4 shows configuration of the interference objective lens unit 30 when the focal point position is shifted by changes in temperature.

However, a change in the temperature within the predetermined usage environment temperature range causes a change in the refractive index or the curvature of the convex lenses 31a, 31b, and 31c, thus resulting in a shift of the focal point position as shown in FIG. 4. FIG. 4 illustrates an example where the temperature increases and the focal point position moves away.

Specifically, with only the first holder 34 formed by material having a low linear expansion coefficient, it is difficult to completely suppress the shift of the focal point position.

Figure 5:
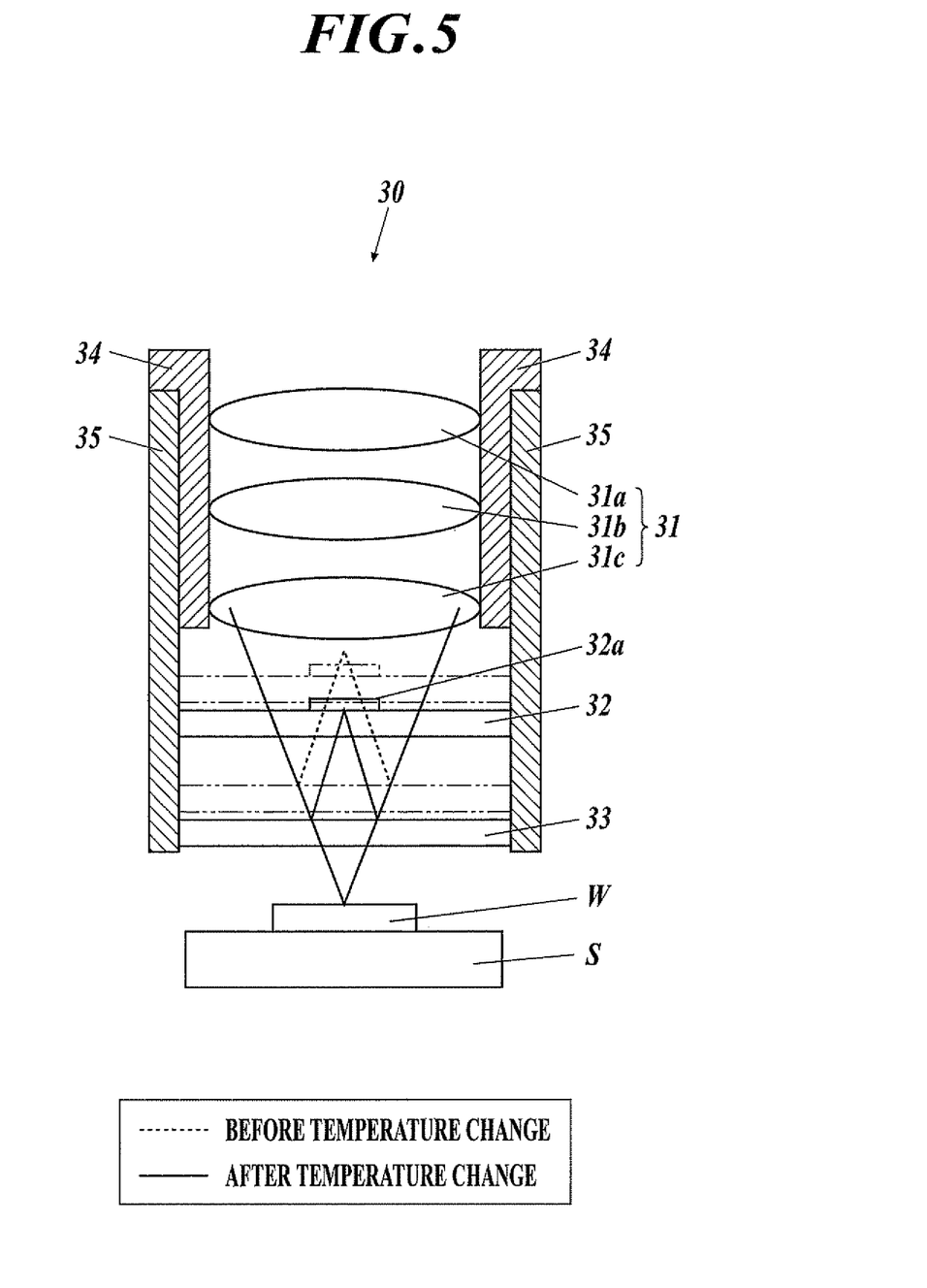
FIG. 5 shows configuration of the interference objective lens unit 30 when the optical path difference caused by the shift of the focal point position is corrected by changes in temperature of the second holder.

In this embodiment, the second holder 35 is formed by material having the second linear expansion coefficient higher than the first linear expansion coefficient. Thus, when the temperature changes, the second holder 35 expands or contracts. In the case of FIG. 5, the temperature increases, the reflection position of the beam splitter 33 shifts in the downward direction, and the reflection position of reference mirror 32a also shifts in the downward direction.

As described above, a change in the temperature within the predetermined usage environment temperature range causes, due to a difference in the linear expansion coefficient between the first holder 34 and the second holder 35, a change in the distance $d_1$ between the transparent plate 32 and the beam splitter 33 to thereby correct the optical path difference.

As described above, the interference objective lens unit 30 and the shape measuring apparatus 1 of this embodiment include: the first holder 34 that at least holds the objective lenses 31 and that is formed by material having the first linear expansion coefficient; and the second holder 35 that at least holds the transparent plate 32 having the reference mirror 32a placed thereon and that is formed by material having the second linear expansion coefficient. When a change in the usage environment temperature is caused within the predetermined usage environment temperature range, the optical path difference is corrected by the difference in the linear expansion coefficient between the first holder 34 and the second holder 35.

Thus, the interference fringes are prevented from having a decreased luminance even when the usage environment temperature changes within the predetermined usage environment temperature range, thus providing a measurement of high precision.

According to the interference objective lens unit 30 and the shape measuring apparatus 1 of this embodiment, the second holder 35 is formed by material having the second linear expansion coefficient higher than the first linear expansion coefficient.

Thus, the first holder 34 can be used to substantially suppress the shift of the focal length due to a change in the space among the convex lenses 31a, 31b, and 31c. The second holder 35 can be used to cause, in accordance with the shift of the focal length due to a change in the curvature or the refractive index of the objective lenses 31 for example, a change in the distance $d_1$ between the transparent plate 32 and the beam splitter 33 to thereby correct the optical path difference.

According to the interference objective lens unit 30 and the shape measuring apparatus 1 of this embodiment, the objective lenses 31 are formed by resin material.

Thus, when compared with a case where the objective lenses 31 are formed by glass, the apparatus of this embodiment can be manufactured at a lower cost and a weight thereof can be made lighter.

A resin lens has a thermal expansion coefficient higher than that of a glass lens. Thus, there is a concern of a declined measurement precision due to the surrounding environmental temperature. However, according to this embodiment, the distance $d_1$ between the transparent plate 32 and the beam splitter 33 can be changed depending on the shift of the focal point position due to the deformation of the objective lenses 31 as described above to thereby correct the optical path difference.

Consequently, although a low-cost, the apparatus can be used to perform a measurement of high precision.

Although the above embodiment has been described with an example where the focal length moves away, with reference to FIG. 4 and FIG. 5, another case where the contraction of the objective lenses 31 for example causes the focal length to move closer can also be handled by forming the second holder 35 by such material that contracts with an increase of the usage environment temperature.

(Modification)

Next, the following section will describe a modification of the present invention.

Figure 6:
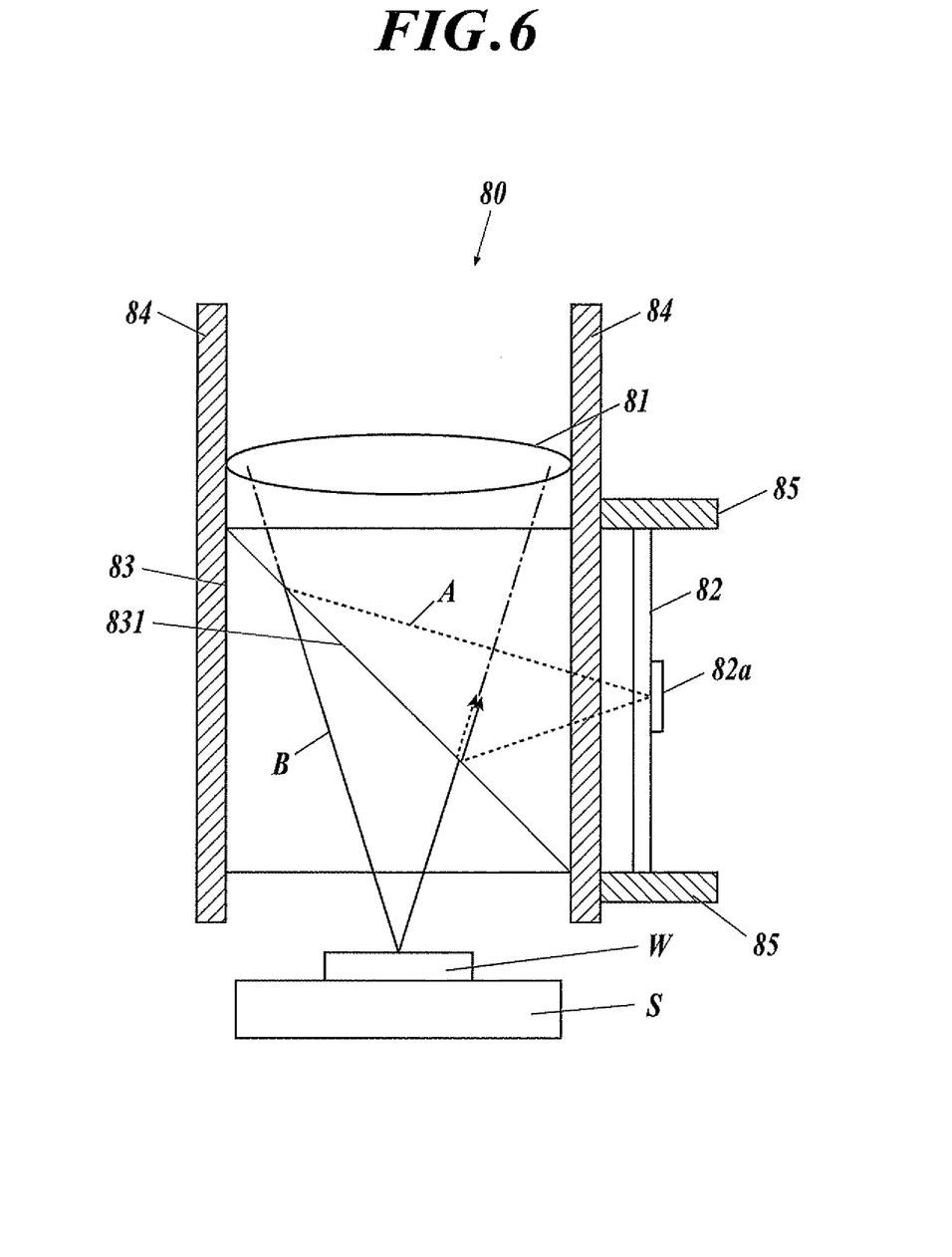
FIG. 6 shows an enlarged principal part of the interference objective lens unit of the modification.

In the modification, a case will be described where the Michelson-type interference objective lens unit 80 instead of the Mirau-type interference objective lens unit 30 is applied to the shape measuring apparatus 1.

As shown in FIG. 6, the interference objective lens unit 80 includes: an objective lens 81; a transparent plate 82 with a reference mirror 82a; a beam splitter 83; a first holder 84; and a second holder 85 for example.

The objective lens 81 is composed of one convex lens. Light emitted from the beam splitter 21 transmits through the objective lens 81 to thereby converge on the measuring object W. The objective lens 81 can be formed by material similar to that of the objective lenses 31.

Although the objective lens 81 composed of one convex lens is shown as an example, the objective lens 81 is not limited to this.

The beam splitter 83 is a beam splitter cube for example that is provided at the lower side of the objective lens 81 so that the reflecting plane 831 has an angle of 45° to the optical axis. The light irradiated from the upper side of the objective lens 81 is partially reflected by the reflecting plane 831.

The transparent plate 82 with the reference mirror 82a is provided at a side of the beam splitter 83. The light that is emitted from the upper side of the objective lens 81 and that is reflected by the reflecting plane 831 is reflected by the reflecting plane of the reference mirror 82a. The reflected light (reference light) A reflected from the reflecting plane 831 is reflected by the reference mirror 82a to the reflecting plane 831.

The transparent plate 82 is composed of a transparent plate body formed by glass or plastic for example.

The first holder 84 holds the objective lens 81 and the beam splitter 83. The first holder 84 can be formed by material similar to the above-described first holder 34.

The second holder 85 holds the transparent plate 82 with the reference mirror 82a at a side of the first holder 84. The second holder 85 can be formed by material similar to the above-described second holder 35.

In the interference objective lens unit 80, when collimated light enters the objective lens 81, the incident light becomes convergent light at the objective lens 81 and this light enters the reflecting plane 831 of the beam splitter 83 for which the reflecting plane 831 is obliquely provided to the axis of the objective lens 81. Then, the incident light is split into the reference light A passing through to the reference optical path having therein the reference mirror 82a (denoted by the broken line of FIG. 6) and the object light B passing through the measuring optical path having the measuring object W placed therein (denoted by the solid line of FIG. 6) by the reflecting plane 831.

The reference light A is reflected by the reference mirror 82a and further reflected by the reflecting plane 831 of the beam splitter 83. The object light B on the other hand is reflected by the surface of the measuring object W and transmits through the reflecting plane 831 of the beam splitter 83.

Here, the reference light A from the reference mirror 82a and the object light B from the measuring object W are superposed at the reflecting plane 831 of the beam splitter 83 to form a superposed wave.

In this modification, the objective lens 81 and the beam splitter 83 are held by the first holder 84 and the transparent plate 82 with the reference mirror 82a is held by the second holder 85.

Thus, when the temperature changes within the set usage environment temperature range and the focal point position changes, a difference between the linear expansion coefficients of the first holder 84 and the second holder 85 can be used to correct the optical path difference in accordance with the shift of the focal point position of the objective lens 81, thus realizing a zero phase difference between the reference light A and the object light B.

Specifically, the second holder 85 is formed by material having the second linear expansion coefficient higher than the first linear expansion coefficient of the first holder 84. Thus, the second holder 85 expands or contracts depending on the environmental temperature to thereby cause a change in the distance between the transparent plate 82 and the beam splitter 83. This can consequently suppress the occurrence of the optical path difference.

Therefore, the optical path difference due to a temperature change is corrected also in this modification without decreasing the brightness of the interference fringes.

The above embodiment and modification have been described based on the assumption that the objective lenses 31 and 81 are formed by resin material. However, the objective lenses 31 and 81 can also be formed by any known materials such as glass for example. In any case, by selecting the first holder and the second holder in consideration of the deformation of the objective lens that may occur at a set environmental temperature, the occurrence of the optical path difference can be suppressed and a measurement of high precision can be performed without decreasing the brightness of the interference fringes.

Although the above embodiment and modification have been described based on an assumption that the second holders 35 and 85 are formed by material having the second linear expansion coefficient higher than the first linear expansion coefficient of the material of the first holders 34 and 84, another configuration is also possible where the first holder is formed by material having the first linear expansion coefficient higher than the second linear expansion coefficient of the second holder.

In this case, materials of the first holder and the second holder are selected so that the shift of the focal point position due to the deformation of the objective lens is corrected by the first holder, and the second holder substantially does not deform for example.

The entire disclosure of Japanese Patent Application No. 2010-239570 filed on Oct. 26, 2010 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An interference objective lens unit, comprising:
an objective lens that causes light emitted from a light source to converge on a measuring object;
a beam splitter that is provided closer to the measuring object than the objective lens, that splits the light transmitted through the objective lens into a reference optical path in which a reference mirror is provided and a measuring optical path in which the measuring object is placed, and that superposes reflected light from the reference mirror and reflected light from the measuring object to output interference light;
a first holder that holds the objective lens and that is formed by material having a first linear expansion coefficient, the first holder holding the objective lens by contacting the objective lens; and
a second holder that holds a plate having the reference mirror by contacting the plate, the second holder formed by material having a second linear expansion coefficient which is different from the first linear expansion coefficient, wherein
when a usage environment temperature changes, a difference in the linear expansion coefficients between the first holder and the second holder corrects an optical path difference between the reference optical path and the measuring optical path.

2. The interference objective lens unit according to claim 1, wherein the second linear expansion coefficient is higher than the first linear expansion coefficient.

3. The interference objective lens unit according to claim 1, wherein the second linear expansion coefficient is lower than the first linear expansion coefficient.

4. The interference objective lens unit according to claim 1, wherein the objective lens is formed by resin material.

5. The interference objective lens unit according to claim 1, wherein the beam splitter is held by the first holder.

6. The interference objective lens unit according to claim 1, wherein the beam splitter is held by the second holder.

7. The interference objective lens unit according to claim 1, wherein the objective lens includes a first side portion and a second side portion, and the first holder contacts the objective lens at the first side portion and the second side portion.

8. A light-interference measuring apparatus, comprising:
the interference objective lens unit according to claim 1;
a light source that outputs light to the interference objective lens unit;
an optical path length changing unit that changes at least one of the reference optical path and the measuring optical path; and
an imaging unit that images an interference image by the interference light output from the interference objective lens unit.

* * * * *